US012742934B2

(12) United States Patent
Turner et al.

(10) Patent No.: US 12,742,934 B2
(45) Date of Patent: Sep. 22, 2026

(54) OPTICAL FIBER SHUFFLE CIRCUIT

(71) Applicant: Lightmatter, Inc., Boston, MA (US)

(72) Inventors: Robert Turner, Georgetown, TX (US); Bradford Turcott, Georgetown, TX (US); Darius Bunandar, Boston, MA (US)

(73) Assignee: Lightmatter, Inc., Mountain View, CA (US)

( * ) Notice: Subject to any disclaimer, the term of this patent is extended or adjusted under 35 U.S.C. 154(b) by 269 days.

(21) Appl. No.: 18/598,048

(22) Filed: Mar. 7, 2024

(65) Prior Publication Data

US 2024/0310593 A1 Sep. 19, 2024

Related U.S. Application Data

(60) Provisional application No. 63/490,758, filed on Mar. 16, 2023.

(51) Int. Cl.
*G02B 6/35* (2006.01)
*G02B 6/43* (2006.01)
*G02B 6/42* (2006.01)

(52) U.S. Cl.
CPC ............. *G02B 6/3596* (2013.01); *G02B 6/43* (2013.01); *G02B 6/425* (2013.01); *G02B 6/4293* (2013.01)

(58) Field of Classification Search
None
See application file for complete search history.

(56) References Cited

U.S. PATENT DOCUMENTS

| | | | | |
|---|---|---|---|---|
| 11,036,002 | B2 | 6/2021 | Harris et al. | |
| 11,561,348 | B2 * | 1/2023 | Zhang | G02B 6/4246 |
| 11,953,724 | B2 | 4/2024 | Harris et al. | |
| 2008/0089640 | A1 | 4/2008 | Beausoleil | |
| 2014/0161385 | A1 * | 6/2014 | Lessard | G02B 6/136 264/1.27 |
| 2014/0264400 | A1 | 9/2014 | Lipson et al. | |
| 2016/0202432 | A1 * | 7/2016 | Chen | G02B 6/4227 385/14 |
| 2017/0237516 | A1 | 8/2017 | Welch | |
| 2019/0162901 | A1 | 5/2019 | Yu et al. | |
| 2020/0135650 | A1 | 4/2020 | Kuo et al. | |
| 2020/0284981 | A1 * | 9/2020 | Harris | G02B 6/1225 |

(Continued)

OTHER PUBLICATIONS

International Search Report and Written Opinion dated Jun. 21, 2024, in connection with International Application No. PCT/US2024/18781.

(Continued)

*Primary Examiner* — Jerry Rahll
(74) *Attorney, Agent, or Firm* — Wolf, Greenfield & Sacks, P.C.

(57) ABSTRACT

Described herein are optical fiber shuffle circuits designed to programmably interconnect any number of ports without having to rely on thousands of optical fibers or more. The optical fiber shuffle circuits developed by the inventors and described herein can be built into photonic interposers. Photonic interposers of the types described herein include, for example, semiconductor substrates patterned (photo-lithographically) with photonic integrated circuits such as waveguides, modulators, photodetectors, switches, couplers, etc., or any combination thereof.

20 Claims, 5 Drawing Sheets

(56) References Cited

U.S. PATENT DOCUMENTS

| | | | |
|---|---|---|---|
| 2022/0373734 | A1 | 11/2022 | Duong et al. |
| 2023/0076917 | A1* | 3/2023 | Tanaka .................... G02F 1/313 |
| 2023/0085268 | A1 | 3/2023 | Harris et al. |
| 2023/0114842 | A1 | 4/2023 | Harris et al. |

OTHER PUBLICATIONS

U.S. Appl. No. 63/325,113, Package Assembly Flow and Materials, as filed Mar. 29, 2022.

* cited by examiner

OPTICAL FIBER SHUFFLE CIRCUIT

CROSS-REFERENCE TO RELATED APPLICATION

This application claims the benefit under 35 U.S.C. § 119(e) of U.S. Provisional Patent Application Ser. No. 63/490,758, filed Mar. 16, 2023, and entitled "OPTICAL FIBER SHUFFLE CIRCUIT," which is hereby incorporated herein by reference in its entirety.

BACKGROUND

Optical fibers are thin, flexible strands of glass or plastic that are used to transmit light signals over long distances with minimal loss of signal strength. They include a core, which is the central region where light propagates, surrounded by a cladding layer that has a lower refractive index than the core, allowing the light to be confined within the core through total internal reflection. In optical networks, optical fibers are used as the medium for transmitting data signals in the form of light pulses. These pulses can carry a vast amount of information, including voice, video, and data.

BRIEF SUMMARY

Some embodiments relate to a photonic system, comprising: a photonic interposer patterned on a substrate, the photonic interposer having a plurality of sites, wherein each of at least some of the plurality of sites comprises: an optical flow switch having an input waveguide and a plurality of output waveguides, wherein at least some of the output waveguides couple the site to one or more other sites of the plurality of sites; a fiber coupler coupled to the optical flow switch; a plurality of optical modulators coupled to the input waveguide; a first plurality of electrical connections configured to connect to a corresponding processor die; and a second plurality of electrical connections configured to connect to a corresponding router die, wherein the optical modulators are coupled to the second plurality of electrical connections.

In some embodiments, wherein each of the at least some of the plurality of sites further comprises a plurality of photodetectors coupled to an output waveguide of the plurality of output waveguides.

In some embodiments, the fiber coupler is arranged to couple to a plurality of optical fibers.

In some embodiments, the photonic system further comprises a controller configured to control the optical flow switches of the at least some of the plurality of sites to transfer data generated by the processor die of a first site to the processor die of a second site.

In some embodiments, the photonic system further comprises a controller configured to control the optical flow switches of the at least some of the plurality of sites to transfer data generated by the processor die of a first site to the fiber coupler of a second site.

In some embodiments, the controller is further configured to transfer the data generated by the processor die of the first site to a first optical fiber of a plurality of optical fibers coupled to the fiber coupler of the second site.

In some embodiments, the photonic system further comprises a controller configured to control the optical flow switches of the at least some of the plurality of sites to transfer data from the fiber coupler of a first site to the fiber coupler of a second site.

In some embodiments, the controller is further configured to transfer the data to a first optical fiber of a plurality of optical fibers coupled to the fiber coupler of the second site.

In some embodiments, the plurality of optical modulators are configured to modulate light at mutually different wavelengths.

In some embodiments, the fiber coupler comprises an edge coupler positioned at an edge of the photonic interposer.

Some embodiments relate to a computing system, comprising a plurality of processor dies and a plurality of router dies comprising electronic routers; a photonic interposer patterned on a substrate, the photonic interposer having a plurality of sites, wherein the plurality of processor dies and the plurality of router dies are mounted on the photonic interposer, wherein each of at least some of the plurality of sites comprises: an optical flow switch having an input waveguide and a plurality of output waveguides, wherein at least some of the output waveguides couple the site to one or more other sites of the plurality of sites; a fiber coupler coupled to the optical flow switch; a plurality of optical modulators coupled to the input waveguide; a first plurality of electrical connections connecting to a corresponding processor die of the plurality of processor dies; and a second plurality of electrical connections connecting to a corresponding router die of the plurality of router dies, wherein the optical modulators are coupled to the electronic router of the corresponding router die via the second plurality of electrical connections.

In some embodiments, each of the at least some of the plurality of sites further comprises a plurality of photodetectors coupled to an output waveguide of the plurality of output waveguides.

In some embodiments, the fiber coupler is arranged to couple to a plurality of optical fibers.

In some embodiments, the router die connected to the second plurality of electrical connections comprises a plurality of serializers/deserializers (SerDes) coupled to the plurality of optical modulators via the second plurality of electrical connections.

In some embodiments, the router die further comprises a controller configured to control the optical flow switches of the at least some of the plurality of sites and the electronic router of a first site to transfer data generated by the processor die of the first site to the processor die of a second site.

In some embodiments, the router die further comprises a controller configured to control the optical flow switches of the at least some of the plurality of sites and the electronic router of a first site to transfer data generated by the processor die of the first site to the fiber coupler of a second site.

In some embodiments, the router die further comprises a controller configured to control the optical flow switches of the at least some of the plurality of sites and the electronic router of a first site to transfer data from the fiber coupler of the first site to the fiber coupler of a second site.

In some embodiments, the plurality of optical modulators are configured to modulate light at mutually different wavelengths.

In some embodiments, the fiber coupler comprises an edge coupler positioned at an edge of the photonic interposer.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

The inventors have recognized and appreciated that creating large computational systems using conventional co-packaged optics (CPO) approaches is impractical. CPO refers to a technology where optical communication components, such as lasers, modulators, and photodetectors, are integrated and packaged together with an electronic integrated circuit (IC) within the same physical package or module. This integration allows for a tighter coupling between the optical and electronic components, resulting in improved performance, reduced power consumption, and enhanced functionality compared to traditional separate packaging of optical and electronic components. Co-packaged optics are primarily used in data center and high-performance computing (HPC) environments where high-speed, low-latency, and energy-efficient optical communication is crucial. By integrating optical components directly with electronic ICs, co-packaged optics can achieve higher data transmission speeds and lower power consumption compared to conventional optical transceivers.

Figure 1:
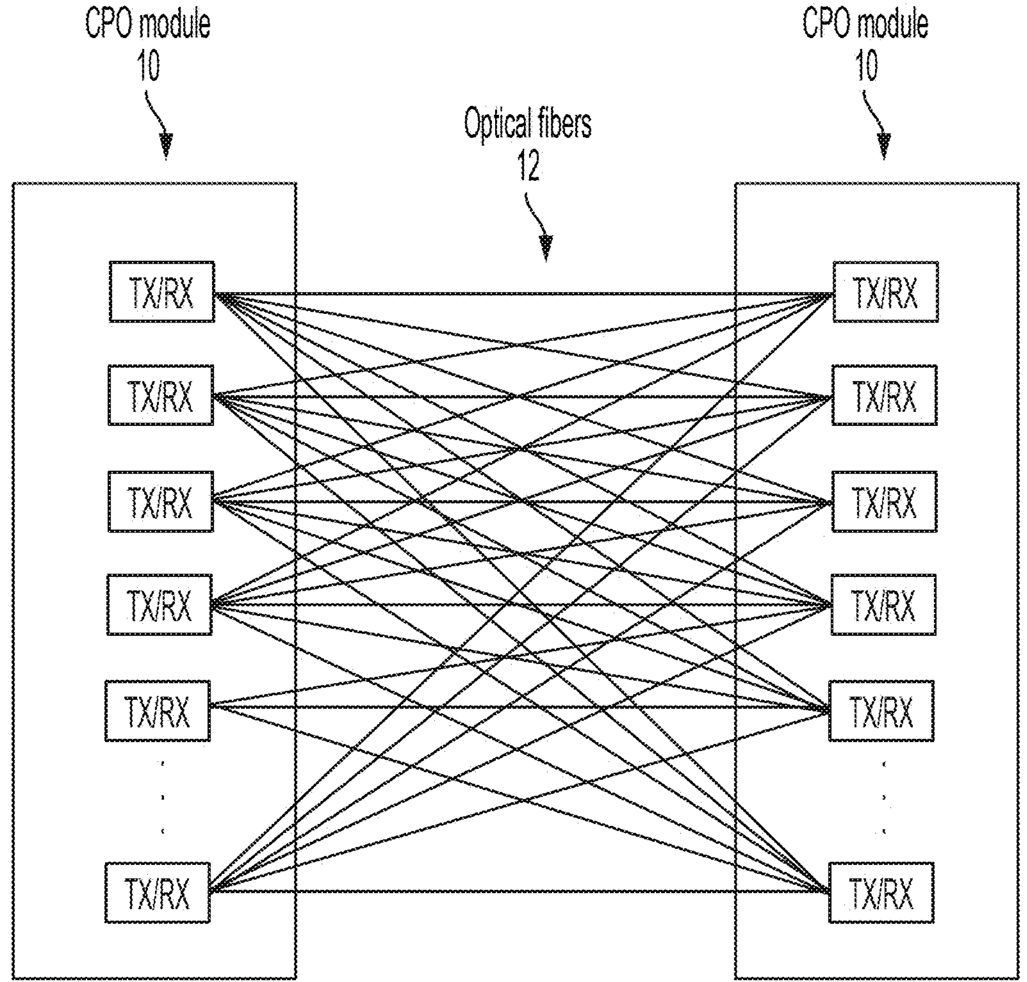
FIG. 1 is a block diagram illustrating a pair of co-packaged optics (CPO) modules coupled to each other in an all-to-all configuration.

However, CPO presents a fundamental limitation that reduces the scalability of computational systems. In computing architectures where all-to-all communication links are desired, connecting I/Os ports to one another in CPO-based systems often requires several thousands (or even tens of thousands or hundreds of thousands) of optical fibers. Each fiber must be properly plugged to the appropriate port, making this approach extremely impractical, labor-intensive and costly. System integrators often use optical fiber looms to handle vast amounts of optical fibers, but this approach is space-inefficient because fiber looms are bulky. FIG. 1 is a block diagram illustrating a pair of co-packaged optics (CPO) modules coupled to each other in an all-to-all configuration (e.g., in a bipartite manner). In this example, each CPO module 10 includes multiple optical transceivers (TX/RX). As shown, each transceiver of one module is connected (via fibers) to each transceiver of the other module. To build a system with one thousand endpoints/leaf nodes (which is not unusual in high-performance computing), the system integrator has to handle approximately one hundred thousand fibers, which is extremely impractical.

The inventors have developed optical fiber shuffle circuits designed to programmably interconnect any number of ports without having to rely on thousands of optical fibers or more. The optical fiber shuffle circuits developed by the inventors and described herein can be built into photonic interposers. Photonic interposers of the types described herein include, for example, semiconductor substrates patterned (photolithographically) with photonic integrated circuits such as waveguides, modulators, photodetectors, switches, couplers, etc., or any combination thereof.

In some embodiments, photonic interposers are organized in "sites" (referred to also as "tiles"), for example in a 1D arrangement or a 2D arrangement. Each site may include optical circuitry configured to communicate with 1) electronic circuitry mounted to the photonic interposer, 2) optical fiber(s) attached to the photonic interposer in correspondence with that site, and/or 3) other sites. The sites may be patterned photolithographically on a photonic interposer, and may be instantiations (e.g., identical copies) of a template site. For example, the sites may be fabricated using reticle stitching techniques, whereby a stepper tool forms multiple, adjacent instantiations of a reticle. In this system, a single parent mask set defines a reticle, and is used numerous times across the substrate to form a tiled photonic integrated circuit. It should be noted that in some embodiments, some portions of an interposer may be patterned using a first photomask set and other portions of the interposer may be patterned using a second photomask set (which may be a mirror image of the first mask set in some embodiments). It should be further noted that not all the photonic interposers described herein need to be fabricated using reticle stitching techniques. Instead, multiple sites may be formed with a single reticle instantiation.

The optical circuitry of a site may include an optical flow switch configured to route optical signals from one portion of an interposer to another portion of the interposer in a programmable fashion. An optical flow switch may include multiple controllable (e.g., electrically controllable) optical switches configured to selectively couple any one of numerous input channels to any one of numerous output channels. In some embodiments, for example, an optical flow switch may receive multiple wavelength division multiplexing (WDM) channels on a common input waveguide, and may route each WDM channel to a certain output waveguide. The association between WDM channels and output waveguides may be varied over time depending on the control signal. The opposite arrangement is also possible (multiple input waveguides being associated to WDM channels on a common output waveguide). Additionally, or alternatively, an optical flow switch may receive multiple channels across multiple input waveguides, and may route each channel to a certain output waveguide. Again, the association between input waveguides and output waveguides may not be fixed, and may be varied over time depending on the control signal. Optical switches may be implemented, for example, using resonant devices (e.g., ring-shaped or disk-shaped) and/or using Mach Zehnder interferometers (MZI), among other types of controllable switches.

In another aspect of the present disclosure, the ability to route data among multiple chips (e.g., multiple processor communicating with each other and/or multiple memories communicating with each other and/or processors communicating with memories) may be enhanced by providing a combination of routing data in the photonic domain and routing data in the electronic domain. This approach leverages the benefits provided by either technology: the high-speed, low-power nature of photonic routing and the programmability of electronic routing. Therefore, in addition to optical flow switches, some embodiments include electronic routers mounted on an interposer.

Figure 2:
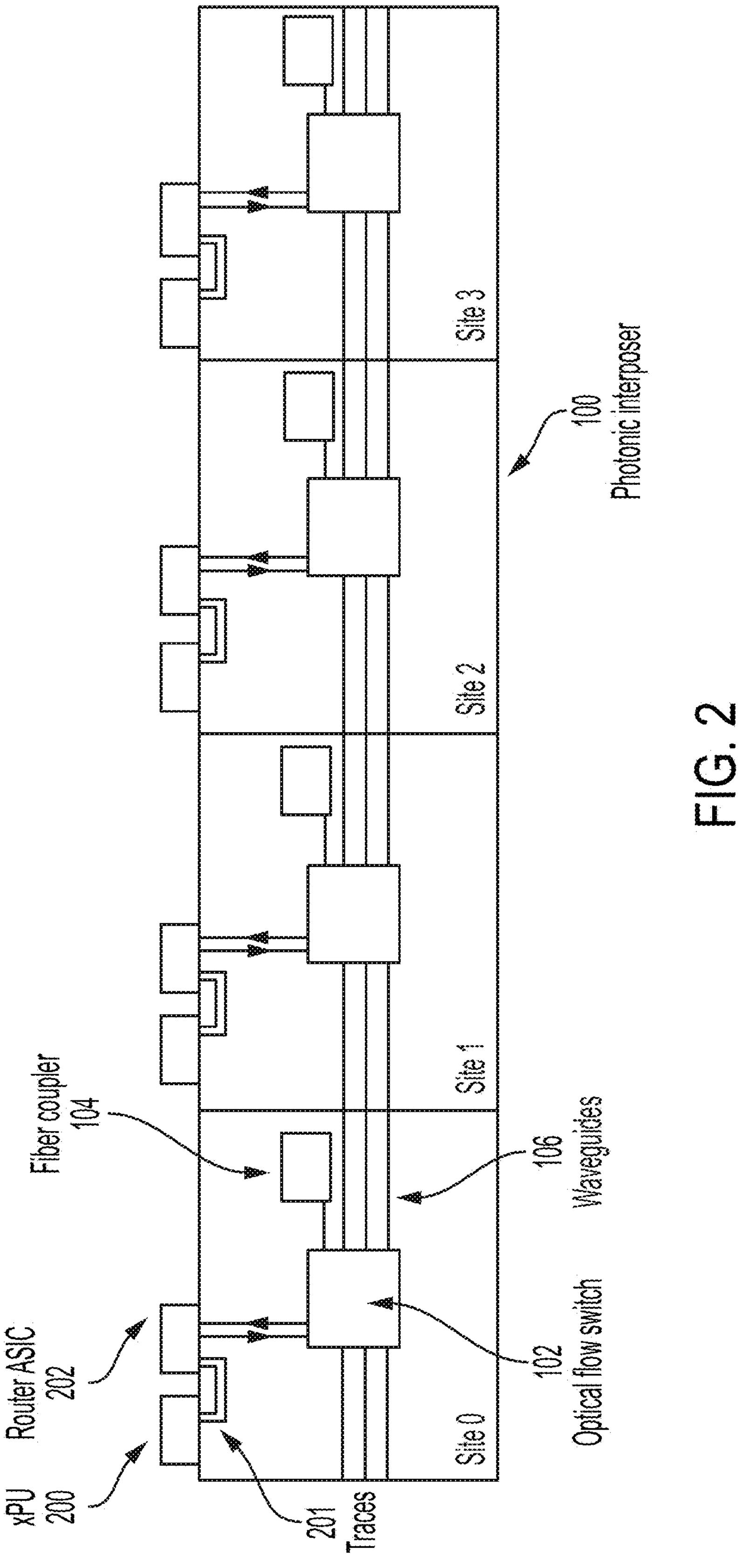
FIG. 2 is a cross sectional view of a computing system including a photonic interposer, in accordance with some embodiments.
Figure 3:
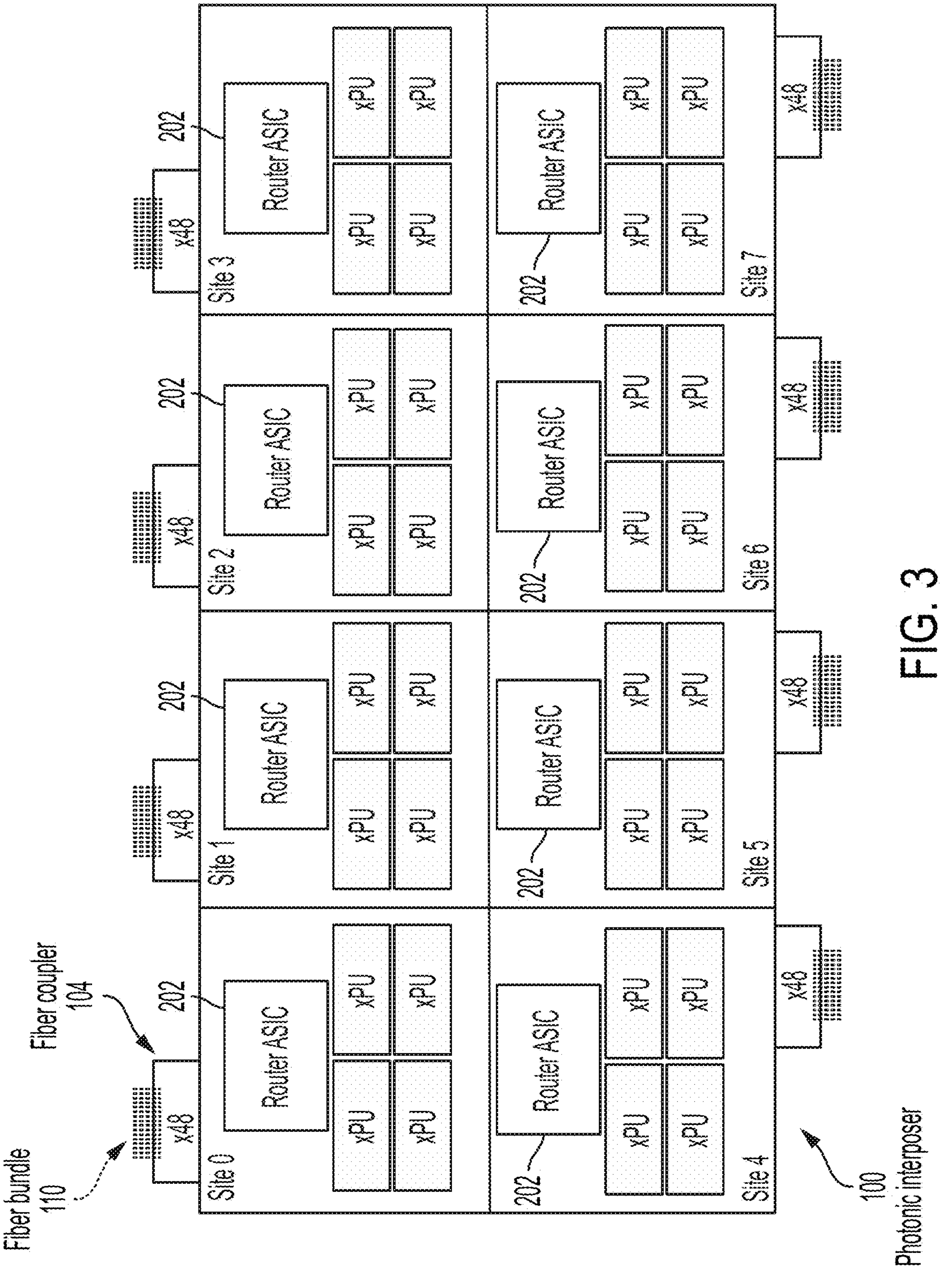
FIG. 3 is a top view of a computing system including a photonic interposer, in accordance with some embodiments.

FIG. 2 is a cross sectional view of a computing system including a photonic interposer, in accordance with some embodiments. Photonic interposer 100 includes multiple sites, which in some (but not all) embodiments may be instantiations (e.g., identical copies) of a template site. The representative cross section of FIG. 2 illustrates four sites (sites 0, 1, 2 and 3), although any other suitable number of sites is possible, whether in a 1D or a 2D arrangement (as shown in FIG. 3).

Each site includes optical waveguides 106, which optically couple the site to one another. The waveguides couple to optical flow switches 102, which may route signals between particular inputs and particular outputs depending on the needs of the computing system. Waveguides 106 serve either as inputs or outputs to an optical flow switch, depending on the direction of the data. In addition to waveguides 106, an optical flow switch may be further coupled to a fiber coupler 104 and a router ASIC 202.

Fiber coupler 104 may include passive optical devices (e.g., edge couplers and/or out-of-plane couplers such as gratings) configured to optically couple to fibers. As such, an optical flow switch 102 may route data form and to devices positioned outside interposer 100 and connected to interposer 100 via fibers. In one example, a fiber coupler 104 couples to as many as 48 fibers, although some embodiments may include more or fewer fibers.

A router ASIC 202 may be a die mounted on interposer 100 and configured to provide electronic routing of data. Router ASIC 202 may be coupled to an xPU 200 (e.g., a CPU or a GPU) via traces 201. xPU 200, also referred to as processor 200, may also be mounted on interposer 100. As discussed in detail further below, a router ASIC 202 may be connected to a set of multiple xPUs 200 in some embodiments. As further shown in FIG. 2, optical channels couple a router ASIC 202 to an optical flow switch in either direction.

The optical flow switches and the router ASICs are configured to route data between any two points of a computing system. In one example, one of the xPUs located at site 0 originates data intended to be routed to a memory attached to one of the fibers coupled to site 3. In this example, a controller controls the router ASIC of site 0 to route the data originated by the xPU to the optical flow switch of site 0. The controller further controls the optical flow switch of site 0 to route the data to the optical flow switch of site 1, the optical flow switch of site 1 to route the data to the optical flow switch of site 2, and the optical flow switch of site 2 to route the data to the optical flow switch of site 3. Lastly, the controller controls the optical flow switch of site 3 to route (via fiber coupler 104) the data to the fiber to which the destination memory is attached.

In another example, one of the xPUs located at site 0 originates data intended to be routed to one of the xPUs located at site 3. In this example, the controller controls the router ASIC of site 0 to route the data originated by the xPU to the optical flow switch of site 0. The controller further controls the optical flow switch of site 0 to route the data to the optical flow switch of site 1, the optical flow switch of site 1 to route the data to the optical flow switch of site 2, and the optical flow switch of site 2 to route the data to the optical flow switch of site 3. Lastly, the controller controls the optical flow switch of site 3 to route (via the router ASIC of site 3) the data to the destination xPU, at site 3.

In some embodiments, the data are received by the router ASIC at site 3, which extracts the header and conveys data electronically to the destination xPU at site 3. This embodiment makes use of the combination of the optical flow switching enabled by the photonic interposer 100 and the packet switching enabled by the router ASIC 202. In this case, two router ASICs (at site 0 and site 3) determine and route the data to the destination. The speed of optical flow switching is limited by the speed at which the optical switch elements can be modulated. If the elements use thermal effects (e.g., thermal phase shifters), then the bandwidth of the modulation may be limited to under a few MHz. The speed of packet switching is limited by the speed at which the headers of data can be read and the data can be routed within the electrical switches of the router ASIC. These routers can be clocked at GHz-level and hence represents a fast way of redirecting data (although that may come at the expense of power consumption).

In yet another example, one of the xPUs located at site 0 originates a packet intended to be routed to one of the xPUs located at site 3 and another packet intended to be routed to a memory attached to one of the fibers coupled to site 0. In this example, the control may leverage WDM channels to transmit the different packets to different destinations. For example, the controller may control the router ASIC of site 0 to encode the packet intended for the xPUs located at site 3 using one wavelength ($\lambda_1$) and the packet intended for the memory attached to one of the fibers coupled to site 0 using another wavelength ($\lambda_2$). The optical flow switch of site 0 may route the packets depending upon the wavelength on which they are encoded. For example, $\lambda_1$ may be routed to site 1 and $\lambda_2$ may be routed to the fiber coupler of site 0. The following flow switches may further route the $\lambda_1$-packet to the final destination, as in the example described above.

FIG. 3 is a top view of a computing system including a photonic interposer 100 with eight sites (0, 1, 2, 3, 4, 5, 6, 7) arranged in two rows and four columns, in accordance with some embodiments. Of course, any other number of sites is possible. It should be noted that FIG. 2 may represent a cross section of the system of FIG. 3. In the example of FIG. 3, each site hosts a router ASIC 202 and four xPUs 200. A router ASIC 202 connects to each xPU of the same site via traces 201 (shown in FIG. 2). As discussed above, the sites are coupled to each other optically, via waveguides 106 and optical flow switches 102. In this example, fiber couplers 104 are coupled to a fiber bundle 110, which includes 48 fibers. It should also be noted that not all sites need to be arranged in the same manner. For example, some sites may have more xPUs than others. In some embodiments, some sites (or all the sites) may have one or more memory chips in addition (or in alternative) to the xPUs. Similar to the xPUs, the memory chips may be connected to the corresponding router ASIC via traces 201.

The system of FIG. 3, using a combination of photonic routing (thanks to optical flow switches 102) and electronic routing (thanks to router ASICs 202), enables a high degree of programmability while at the same time keeping the number of fibers relatively low (384 fibers in this example), representing a significant improvement over the several thousands of fibers required in convention CPO solutions.

Figure 4:
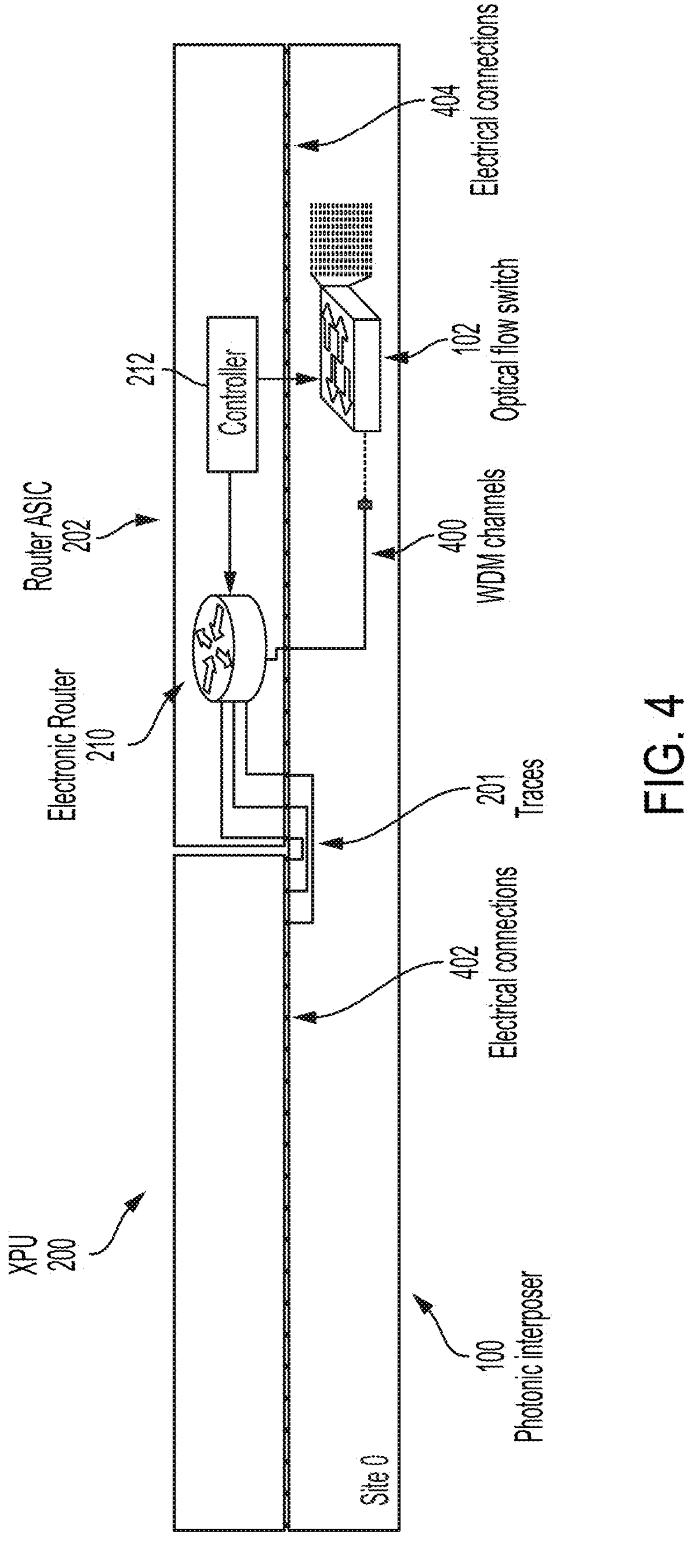
FIG. 4 is a cross sectional view illustrating a portion of the computing system of FIG. 2 in additional detail, in accordance with some embodiments.

FIG. 4 is a cross sectional view illustrating a portion of the computing system of FIG. 2 in additional detail, in accordance with some embodiments. In particular, FIG. 4 illustrates a portion of site 0. The die of xPU 200 is connected to photonic interposer 100 via electrical connections 402. Similarly, the die of router ASIC 202 is connected to photonic interposer 100 via electrical connections 404. In some embodiments, in the interest of accommodating chips of different types (xPU vs. router ASIC), electrical connections 402 may differ from electrical connections 404 in one or more respects, including for example in pitch, number of connections, resistance, material, shape, geometry, etc. In one embodiment, the electrical connections 402 are power and signals connections from the xPU to a substrate on which photonic interposer 100 is mounted (not shown in the figures). These electrical connections may not have direct electrical connections with the circuits of the photonic interposer, but rather, may use through-silicon vias (TSVs) within the photonic interposer to connect the xPU with the substrate. The electrical connections 404 may also include TSV connections to connect the ASIC with the substrate, similar to connections 402. However, connections 404 may also be configured to electrically connect the ASIC with the circuits of photonic interposer 100. The direct connections with the photonic interposer may include signals from Tx drivers available in the router ASIC to photonic Tx modulators within 100, signals from transimpedance amplifiers connected to the photonic Rx modulators within 100 to the router ASIC, and control signals that change the configuration of the optical flow switches within photonic interposer 100. In one embodiment, the router ASIC sends analog voltage or current signals that modulate the switching elements within 100 directly. In this case, the router ASIC will also include a controller circuit that calculates the settings of the switching elements based on the desired configuration. In another embodiment, the router ASIC sends digital signals to a digital controller circuit within 100, and this circuit orchestrates the analog voltage or current signals needed to modulate the switching elements within 100 to achieve the desired configuration.

Router ASIC 202 includes an electronic router 210 and a controller 212. Controller 212 may control the operations of the electronic router and the optical flow switch of the same site. In some embodiments, each router ASIC of a site includes a dedicated controller. In other embodiments, however, a single controller may control the operations of all the electronic routers and all the optical flow switches, across all the sites. This controller may be part of one of the router ASICs, or may be on a separate chips (which could also be mounted on interposer 100, or could be external).

In the example of FIG. 4, electronic router 210 and optical flow switch 102 are coupled to one another via WDM channels 400. The WDM channels (characterized by having different wavelengths) may share a common waveguide.

Figure 5:
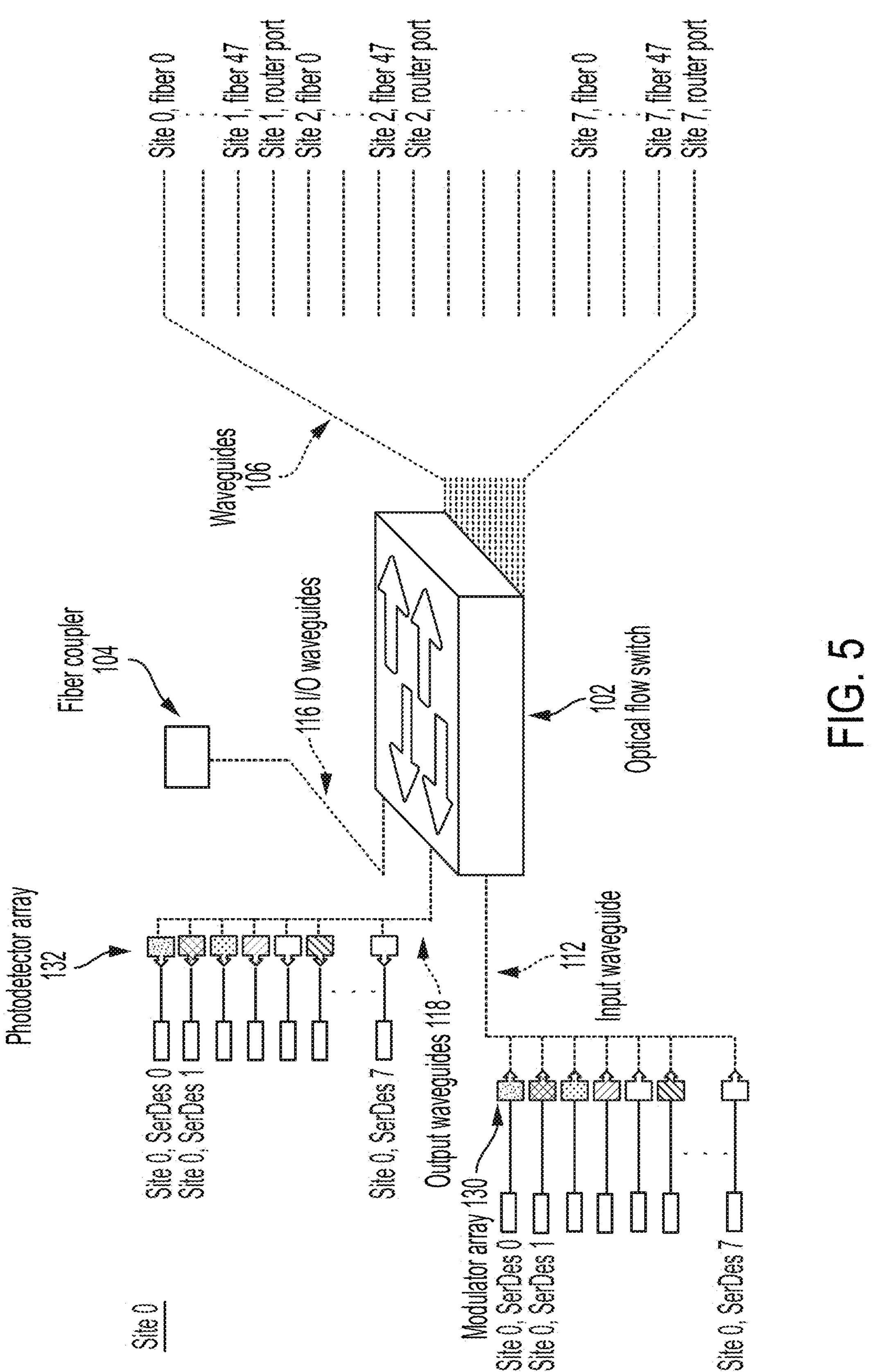
FIG. 5 is a block diagram illustrating an optical flow switch coupled to a plurality of waveguides, in accordance with some embodiments.

FIG. 5 illustrates a representative optical flow switch 102 of site 0 in additional detail, in accordance with some embodiments. One or more waveguides (identified as I/O waveguides 116) couple optical flow switch 102 to fiber coupler 104. In some embodiments, there may be an I/O waveguide 116 for each fiber attached to the fiber coupler (e.g., 48 in the example of FIG. 3). An input waveguide 112 supports optical communication from electronic router 210 to optical flow switch 102, and an output waveguide 118 supports optical communication in the opposite direction (from optical flow switch 102 to electronic router 210). Both the input and output waveguides may support WDM channels.

On the input side, an array of serializers/deserializers (SerDes) (0-7) and array of modulators 130 couple to input waveguide 112. The SerDes may be integrated as part of router ASIC 202 or as part of interposer 100. Modulators 130 may be integrated as part of interposer 100. Each SerDes-modulator pair may modulate a WDM channel with data provided by router ASIC 202.

On the output side, an array of photodetectors 132 and SerDes (0-7) couple to output waveguide 116. The SerDes may be integrated as part of router ASIC 202 or as part of interposer 100. Photodetectors 132 may be integrated as part of interposer 100. Each SerDes-photodetector pair may extract data from a WDM channel, converting it to an electrical signal. Additionally, waveguides 106 couple optical flow switch 102 to the optical flow switches of the other sites and (optionally) to the fiber couplers of the other sites directly (e.g., bypassing the other optical flow switches). Waveguides 106 may enable communication in either direction.

In some embodiments, instead of having one optical switch for each site, the interposer may include a single optical flow switch coupled to all of the router ASICs and all of the fiber couplers of the interposer.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic system, comprising:

a photonic interposer patterned on a substrate, the photonic interposer having a plurality of sites, wherein each of at least some of the plurality of sites comprises:

an optical flow switch having an input waveguide and a plurality of output waveguides, wherein at least some of the output waveguides couple the site to one or more other sites of the plurality of sites;

a fiber coupler coupled to the optical flow switch;

a plurality of optical modulators coupled to the input waveguide;

a first plurality of electrical connections configured to connect to a corresponding processor die;

a second plurality of electrical connections configured to connect to a corresponding router die, wherein the optical modulators are coupled to the second plurality of electrical connections; and a plurality of traces configured to couple the corresponding processor die to a corresponding router die when the processor die and the router die are mounted on the photonic interposer.

2. The photonic system of claim 1, wherein each of the at least some of the plurality of sites further comprises a plurality of photodetectors coupled to an output waveguide of the plurality of output waveguides.

3. The photonic system of claim 1, wherein the fiber coupler is arranged to couple to a plurality of optical fibers.

4. The photonic system of claim 1, further comprising a controller configured to:

control the optical flow switches of the at least some of the plurality of sites to transfer data generated by the processor die of a first site to the processor die of a second site.

5. The photonic system of claim 1, further comprising a controller configured to:

control the optical flow switches of the at least some of the plurality of sites to transfer data generated by the processor die of a first site to the fiber coupler of a second site.

6. The photonic system of claim 5, wherein the controller is further configured to transfer the data generated by the processor die of the first site to a first optical fiber of a plurality of optical fibers coupled to the fiber coupler of the second site.

7. The photonic system of claim 1, further comprising a controller configured to:

control the optical flow switches of the at least some of the plurality of sites to transfer data from the fiber coupler of a first site to the fiber coupler of a second site.

8. The photonic system of claim 7, wherein the controller is further configured to transfer the data to a first optical fiber of a plurality of optical fibers coupled to the fiber coupler of the second site.

9. The photonic system of claim 1, wherein the plurality of optical modulators are configured to modulate light at mutually different wavelengths.

10. The photonic system of claim 1, wherein the fiber coupler comprises an edge coupler positioned at an edge of the photonic interposer.

11. A computing system, comprising:

a plurality of processor dies and a plurality of router dies, each router die comprising an electronic router configured to programmably route data in an electronic domain;

a photonic interposer patterned on a substrate, the photonic interposer having a plurality of sites, wherein the plurality of processor dies and the plurality of router dies are mounted on the photonic interposer, wherein each of at least some of the plurality of sites comprises:

an optical flow switch having an input waveguide and a plurality of output waveguides, the optical flow switch configured to programmably route data in a photonic domain, wherein at least some of the output waveguides couple the site to one or more other sites of the plurality of sites;

a fiber coupler coupled to the optical flow switch;

a plurality of optical modulators coupled to the input waveguide;

a first plurality of electrical connections connecting to a corresponding processor die of the plurality of processor dies; and a second plurality of electrical connections connecting to a corresponding router die of the plurality of router dies, wherein the optical modulators are coupled to the electronic router of the corresponding router die via the second plurality of electrical connections.

12. The computing system of claim 11, wherein each of the at least some of the plurality of sites further comprises a plurality of photodetectors coupled to an output waveguide of the plurality of output waveguides.

13. The computing system of claim 11, wherein the fiber coupler is arranged to couple to a plurality of optical fibers.

14. The computing system of claim 11, wherein the router die connected to the second plurality of electrical connections comprises a plurality of serializers/deserializers (SerDes) coupled to the plurality of optical modulators via the second plurality of electrical connections.

15. The computing system of claim 11, wherein the router die further comprises a controller configured to:

control the optical flow switches of the at least some of the plurality of sites and the electronic router of a first site to transfer data generated by the processor die of the first site to the processor die of a second site.

16. The computing system of claim 11, wherein the router die further comprises a controller configured to:

control the optical flow switches of the at least some of the plurality of sites and the electronic router of a first site to transfer data generated by the processor die of the first site to the fiber coupler of a second site.

17. The computing system of claim 11, wherein the router die further comprises a controller configured to:

control the optical flow switches of the at least some of the plurality of sites and the electronic router of a first site to transfer data from the fiber coupler of the first site to the fiber coupler of a second site.

18. The computing system of claim 11, wherein the plurality of optical modulators are configured to modulate light at mutually different wavelengths.

19. The computing system of claim 11, wherein the fiber coupler comprises an edge coupler positioned at an edge of the photonic interposer.

20. The computing system of claim 11, wherein the photonic interposer further comprises a plurality of traces configured to couple a processor die of the plurality of processor dies with to a corresponding router die of the plurality of router dies.

* * * * *